(12) United States Patent
Pike

(10) Patent No.: US 8,141,163 B2
(45) Date of Patent: Mar. 20, 2012

(54) MALICIOUS CODE DETECTION

(75) Inventor: Geoffrey Pike, Irvine, CA (US)

(73) Assignee: VMware, Inc., Palo Alto, CA (US)

( * ) Notice: Subject to any disclaimer, the term of this patent is extended or adjusted under 35 U.S.C. 154(b) by 863 days.

(21) Appl. No.: 12/124,926

(22) Filed: May 21, 2008

(65) Prior Publication Data

US 2009/0038008 A1 Feb. 5, 2009

Related U.S. Application Data

(60) Provisional application No. 60/952,880, filed on Jul. 31, 2007.

(51) Int. Cl.
*G06F 7/04* (2006.01)

(52) U.S. Cl. .............. 726/26; 726/23; 726/24; 717/154; 717/155

(58) Field of Classification Search ............ 726/26
See application file for complete search history.

(56) References Cited

U.S. PATENT DOCUMENTS

| | | | | |
|---|---|---|---|---|
| 5,471,593 | A * | 11/1995 | Branigin | 712/235 |
| 7,290,253 | B1 * | 10/2007 | Agesen | 717/154 |
| 7,581,089 | B1 * | 8/2009 | White | 712/242 |
| 2005/0044292 | A1 * | 2/2005 | McKeen | 710/51 |
| 2005/0206649 | A1 * | 9/2005 | Whitaker | 345/571 |
| 2007/0101317 | A1 * | 5/2007 | Shoji et al. | 717/131 |
| 2007/0283133 | A1 * | 12/2007 | Williams et al. | 712/227 |
| 2008/0040592 | A1 * | 2/2008 | Vasekin et al. | 712/238 |
| 2008/0133858 | A1 * | 6/2008 | Enbody et al. | 711/163 |
| 2008/0256347 | A1 * | 10/2008 | Eickemeyer et al. | 712/240 |

FOREIGN PATENT DOCUMENTS

WO  WO 2005024630 A1 *  3/2005

OTHER PUBLICATIONS

"Improving Prediction for Procedure Returns with Return-Address-Stack Repair Mechanisms"; Skadron et al.; IEEE: Nov. 30-Dec. 2, 1998; p. 259-271.*

"Repairing Return Address Stack for Buffer Overflow Protection"; Park et al.; Apr. 14-16, 2004, ACM; p. 335-342.*

* cited by examiner

*Primary Examiner* — Taghi Arani
*Assistant Examiner* — Mohammad L. Rahman

(57) ABSTRACT

In a system where an indirect control flow instruction requires a CPU to consult a first memory address, in addition to what is encoded in the instruction itself, for program execution, a method is provided to determine if the first memory address contains a valid or plausible value. The first memory address is compared to an expected or predicted memory address. A difference between the expected or predicted memory address and the first memory address causes an evaluation of any program code about to be executed. The evaluation of code determines whether or not a malicious attack is occurring, or being attempted, that might affect proper operation of the system or program.

60 Claims, 5 Drawing Sheets

MALICIOUS CODE DETECTION

RELATED APPLICATIONS

This is a non-provisional patent application claiming priority from provisional patent application 60/952,880, filed Jul. 31, 2007, entitled "Piggybacking Malicious Code Detection On Mis-predicted Indirect Control Flow," the entire contents of which are herein incorporated by reference for all purposes.

FIELD OF THE INVENTION

One or more embodiments of the present invention relate to malicious code detection.

BACKGROUND OF THE INVENTION

As is well known in the field of computer science, a virtual machine (VM) is a software abstraction—a "virtualization"—of an actual physical computer system. FIG. 1A shows one possible arrangement of computer system 700 that implements virtualization. VM 200 or "guest," is installed on a "host platform," or simply "host," which includes system hardware 100, that is, a hardware platform, and one or more layers or co-resident components comprising system-level software, such as an operating system (OS) or similar software layer responsible for coordinating and mediating access to hardware resources.

As software, the code defining the VM will ultimately execute on the actual system hardware 100. As in almost all computers, this hardware will include one or more CPUs 110, some form of memory 130 (volatile or non-volatile), one or more storage devices such as one or more disks 140, and one or more devices 170, which may be integral or separate and removable.

In many existing virtualized systems, hardware processor(s) 110 are the same as in a non-virtualized computer with the same platform, for example, the Intel x-86 platform. Some hardware processors, however, have been developed to include specific hardware support for virtualization.

Each VM 200 will typically mimic the general structure of a physical computer and as such will usually have both virtual system hardware 201 and guest system software 202. The virtual system hardware typically includes at least one virtual CPU 210, virtual memory 230, at least one virtual disk 240 or similar virtualized mass storage device, and one or more virtual devices 270. Note that a disk—virtual 240 or physical 140—is also a "device," but is usually considered separately because of the important role it plays. All of the virtual hardware components of the VM may be implemented in software to emulate corresponding physical components. The guest system software includes guest operating system (OS) 220 and drivers 224 as needed, for example, for the various virtual devices 270.

To permit computer systems to scale to larger numbers of concurrent threads, systems with multiple CPUs—physical or logical, or a combination—have been developed. One example is a symmetric multi-processor (SMP) system, which is available as an extension of the PC platform and from other vendors. Essentially, an SMP system is a hardware platform that connects multiple processors to a shared main memory and shared I/O devices. Yet another configuration is found in a so-called "multi-core" architecture, in which more than one physical CPU is fabricated on a single chip, with its own set of functional units (such as a floating-point unit and an arithmetic/logic unit ALU), and can execute threads independently; multi-core processors typically share only very limited resources, such as at least some cache. Still another technique that provides for simultaneous execution of multiple threads is referred to as "simultaneous multi-threading," in which more than one logical CPU (hardware thread) operates simultaneously on a single chip, but in which the logical CPUs flexibly share not only one or more caches, but also some functional unit(s) and sometimes also the translation lookaside buffer (TLB).

Similarly, a single VM may (but need not) be configured with more than one virtualized physical and/or logical processor. By way of example, FIG. 1A illustrates multiple virtual processors 210, 211, . . . , 21m (VCPU0, VCPU1, . . . , VCPUm) within VM 200. Each virtualized processor in a VM may also be multi-core, or multi-threaded, or both, depending on the virtualization.

Applications 260 running on the VM will function essentially as they would if run on a "real" computer, even though the applications are running at least partially indirectly, that is, via virtual devices and processor(s). Executable files will be accessed by the guest OS from virtual disk 240 or virtual memory 230, which may be portions of the actual physical disk 140 or memory 130 allocated to that VM. Once an application is installed within the VM, the guest OS retrieves files from the virtual disk just as if the files had been pre-stored as the result of a conventional installation of the application. The design and operation of virtual machines in general are known in the field of computer science.

Some interface is generally required between the guest software within a VM and the various hardware components and devices in the underlying hardware platform. This interface—which may be referred to generally as "virtualization software" or "virtualization layer"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, the term "hypervisor" is often used to describe both a VMM and a kernel together, either as separate but cooperating components or with one or more VMMs incorporated wholly or partially into the kernel itself; however, the term "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in the host OS itself.

Unless otherwise indicated, embodiments of the invention described below may be used in virtualized computer systems having any type or configuration of virtualization software. Moreover, embodiments of the invention are described and illustrated below primarily as including one or more virtual machine monitors that appear as separate entities from other components of the virtualization software. This is only for the sake of simplicity and clarity and by way of illustration—as mentioned above, the distinctions are not always so clear-cut.

By way of illustration and example only, the FIGS. 1A and 1B show each VM running on a corresponding virtual machine monitor. The description's reference to VMMs is also merely by way of common example. A VMM is usually a software component that virtualizes at least one hardware resource of some physical platform, so as to export a hardware interface to the VM corresponding to the hardware the VM "thinks" it is running on. As FIG. 1A illustrates, a virtualized computer system may (and usually will) have more than one VM, each of which may be running on its own VMM.

The various virtualized hardware components in the VM, such as virtual CPU(s) 210, etc., virtual memory 230, virtual disk 240, and virtual device(s) 270, are shown as being part of VM 200 for the sake of conceptual simplicity. In actuality, these "components" are often implemented as software emulations included in some part of the virtualization software, such as the VMM. One advantage of such an arrangement is that the virtualization software may (but need not) be set up to expose "generic" devices, which facilitate, for example, migration of VM from one hardware platform to another.

Different systems may implement virtualization to different degrees—"virtualization" generally relates to a spectrum of definitions rather than to a bright line, and often reflects a design choice in respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another term, which has yet to achieve a universally accepted definition, is "para-virtualization." As the term implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, the term para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to the other virtualization software. According to this view, loading a module such as a driver designed to communicate with other virtualization components renders the system para-virtualized, even if the guest OS as such is an off-the-shelf, commercially available OS not specifically designed to support a virtualized computer system.

In addition to the distinction between full and partial (para-) virtualization, two arrangements of intermediate system-level software layer(s) are in general use as, or as part of, the virtualization software—a "hosted" configuration (illustrated in FIG. 1B) and a non-hosted configuration (illustrated in FIG. 1A). In a hosted virtualized computer system, an existing, general-purpose operating system forms a "host" OS that is used to perform certain input/output (I/O) operations, alongside and sometimes at the request and direction of a virtualization software component such as VMM 300. Host OS 420, which usually includes drivers 424 and supports applications 460 of its own, and the VMM (or similar component) are both able to directly access at least some of the same hardware resources, with conflicts being avoided by a context-switching mechanism. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

In addition to device emulators 370, FIG. 1B also illustrates some of the other components that are also often included in the VMM of a virtualization system; many of these components are found in the VMM of a non-hosted system as well. For example, exception handlers 330 may be included to help context-switching (see again U.S. Pat. No. 6,496,847), and direct execution engine 310 and binary translator 320, often with associated translation cache 325, may be included to provide execution speed while still preventing the VM from directly executing certain privileged instructions in systems that do not otherwise provide such protection (see U.S. Pat. No. 6,397,242, Devine, et al., "Virtualization System Including a Virtual Machine Monitor for a Computer with a Segmented Architecture," 28 May 2002).

In many cases, it may be beneficial to deploy VMMs on top of a software layer—kernel 600—constructed specifically to provide efficient support for the VMs. This configuration is frequently referred to as being "non-hosted." Compared with a system in which VMMs (or other software components or layers with similar functionality) run directly on the hardware platform (such as shown in FIG. 1B), use of a kernel offers greater modularity and facilitates provision of services (for example, resource management) that extend across multiple virtual machines. Compared with a hosted deployment, a kernel may offer greater performance because it can be co-developed with the VMM and be optimized for the characteristics of a workload consisting primarily of VMs/VMMs. Kernel 600 also handles any other applications running on it that can be separately scheduled, as well as any temporary "console" operating system 420 that, in some systems, is included for such operations as booting the system as a whole or enabling certain user interactions with the kernel. The console OS in FIG. 1A may be of the same type as the host OS in FIG. 1B, which is why they are identically numbered—the main difference is the role they play (or are allowed to play, if any) once the virtualized computer system is loaded and running. One example of a non-hosted, virtualized computer system is described in U.S. Pat. No. 6,961,941 (Nelson, et al., "Computer Configuration for Resource Management in Systems Including a Virtual Machine," 1 Nov. 2005).

As above, using virtual machine technology enables unstable or unsafe software to be isolated from a hardware state or system files necessary to run the physical hardware. While the physical hardware may be isolated from a program running on the virtual machine, the virtual machine itself might be vulnerable to malicious software, e.g., viruses or similar attacks.

In a code-injection attack, sometimes also referred to as an "arc-injection attack," for example, an attacker exploits a vulnerability, e.g., a buffer overflow, to inject malicious code into a running application which then causes the injected code to be executed. In one example, a return-to-libc attack uses existing code for nefarious deeds. Buffer overrun examples include Slammer and Robert Morris' 1988 worm that exploited fingerd. The execution of the malicious code may allow the attacker to gain the privileges of the executing program or, generally, interfere with proper operations.

The "injection" of the malicious code may occur by changing return addresses or function pointers used in a program. One defense to such an attack is to check, at run-time, before a vulnerable instruction's execution, whether the destination address is allowed. As one example, one could enforce a policy that only allows return instructions to change the instruction pointer to an instruction preceded by a call instruction. A weaker variant of this policy is enforced by some operating systems, when run on NX-bit-enabled or similar hardware, by requesting that the CPU fault rather than execute an instruction from a "non-executable" page. There are other techniques, such as "whitelisting" that defend against many of the same exploits even on less capable hardware. "Whitelisting" requires that sequences of code to be executed are first checked against a pre-determined list of allowable sequences.

One drawback of known systems is that dynamic checks are expensive in terms of computation resources.

There are some CPUs, and binary translation systems, that contain a prediction mechanism that may be invoked when an indirect control-flow instruction (or the translation thereof) is executed.

U.S. Pat. No. 6,711,672 to Agesen, entitled "Method And System For Implementing Subroutine Calls And Returns In Binary Translation Sub-Systems Of Computers," issued Mar. 23, 2004, assigned to the assignee of the present application, and incorporated herein by reference in its entirety, describes an implementation of return instructions in translated code. Agesen further discusses a prediction methodology within a virtual machine implementation and a system for predicting a destination of control-flow. If the destination is different from that which was predicted, Agesen proposes that the correct destination be recovered or an error declared.

SUMMARY OF THE INVENTION

In a system where an indirect control flow instruction requires a CPU to consult a first memory address, in addition to what is encoded in the instruction itself, for program execution, a method is provided to determine if the first memory address contains a valid or plausible value. The first memory address is compared to an expected or predicted memory address. A difference between the expected or predicted memory address and the first memory address causes an evaluation of either the memory address value itself and/or any program code about to be executed. The evaluation determines whether or not a malicious attack is occurring, or being attempted, that might affect proper operation of the system or program.

In one embodiment, a method of analyzing a first sequence of instructions in a computer system, the method comprises, for each instruction of an indirect control flow (ICF) type in the first sequence: generating a memory address $R_G$; comparing the generated memory address $R_G$ to a corresponding predicted memory address $R_P$; and if it is determined that the generated memory address $R_G$ is not the same as the predicted memory address $R_P$, then evaluating at least one of: directed program code corresponding to the generated memory address $R_G$ prior to execution thereof; and the generated memory address $R_G$.

In yet another embodiment, a method of analyzing program code in a computer system, the method comprises: executing a sequence of instructions in the computer system; for a called subroutine executed in the sequence of instructions: determining a corresponding predicted memory address $R_P$; and storing the predicted memory address $R_P$; upon completion of execution of the called subroutine: retrieving the predicted memory address $R_P$; and comparing a return address $R_G$ to the predicted memory address $R_P$; and if it is determined that the return address $R_G$ is not the same as the predicted memory address $R_P$, then evaluating at least one of: directed program code corresponding to the return address $R_G$ prior to execution thereof; and return address $R_G$.

Another embodiment is a system for analyzing program code, comprising: a processor for executing a sequence of instructions, the sequence of instructions comprising a first subroutine; and a mis-prediction module coupled to the processor to receive therefrom a generated memory address $R_G$ representing a memory address at which the processor will resume execution upon completion of execution of the first subroutine, wherein the mis-prediction module compares the generated memory address $R_G$ to a predicted memory address $R_P$ and, if the generated memory address $R_G$ is not the same as the predicted memory address $R_P$, analyzes at least one of: program code corresponding to the generated memory address $R_G$; and the generated memory address $R_G$.

DETAILED DESCRIPTION

The description to follow refers to "indirect control flow" instructions. In particular, a "direct control flow" instruction is self-contained, whereas an "indirect control flow" instruction is not. An indirect control flow instruction requires a CPU to consult memory or registers in addition to what is encoded in the instruction itself. A return instruction, for example in a subroutine call, is one case. It should be noted that throughout this specification, the term "indirect control flow instruction" includes, but is not limited to, a return instruction, an indirect jump instruction, and an indirect call instruction. One or more embodiments of the present invention can be used in a situation where there has been a write to memory that would not normally occur, i.e., an "attacker" has been able to write to memory, and that memory information is later used for indirect control flow.

In one embodiment, hardware that allows a handler to be invoked upon mis-predicted control flow is combined with enhanced compiler/linker/loader/library software that generates software handlers to inspect relevant data. For example, some pointers in the heap of a running C++ program have a limited number of correct values but there is no practical method to assure that only correct values are in the heap. With one or more embodiments of the present invention, however, return instructions and indirect control-flow can be effectively constrained to only correct values.

In general, when an unexpected branch occurs, there is an inference that something unexpected and, possibly dangerous to system operations, is occurring. The occurrence of an unexpected branch in program code may be an indicator that malicious code is being inserted or an attempt to do so is underway. Advantageously, one or more embodiments of the present invention provide a mechanism for "sanity checking" code that is about to be executed. If it is determined that the code is malicious, or otherwise unwanted, then execution of the code can be prevented and potentially serious consequences avoided.

The technology of subroutine invocation and the implementation of stacks in memory is well described in Agesen, U.S. Pat. No. 6,711,672, and will not be further described here, except as is necessary.

Figure 1A:
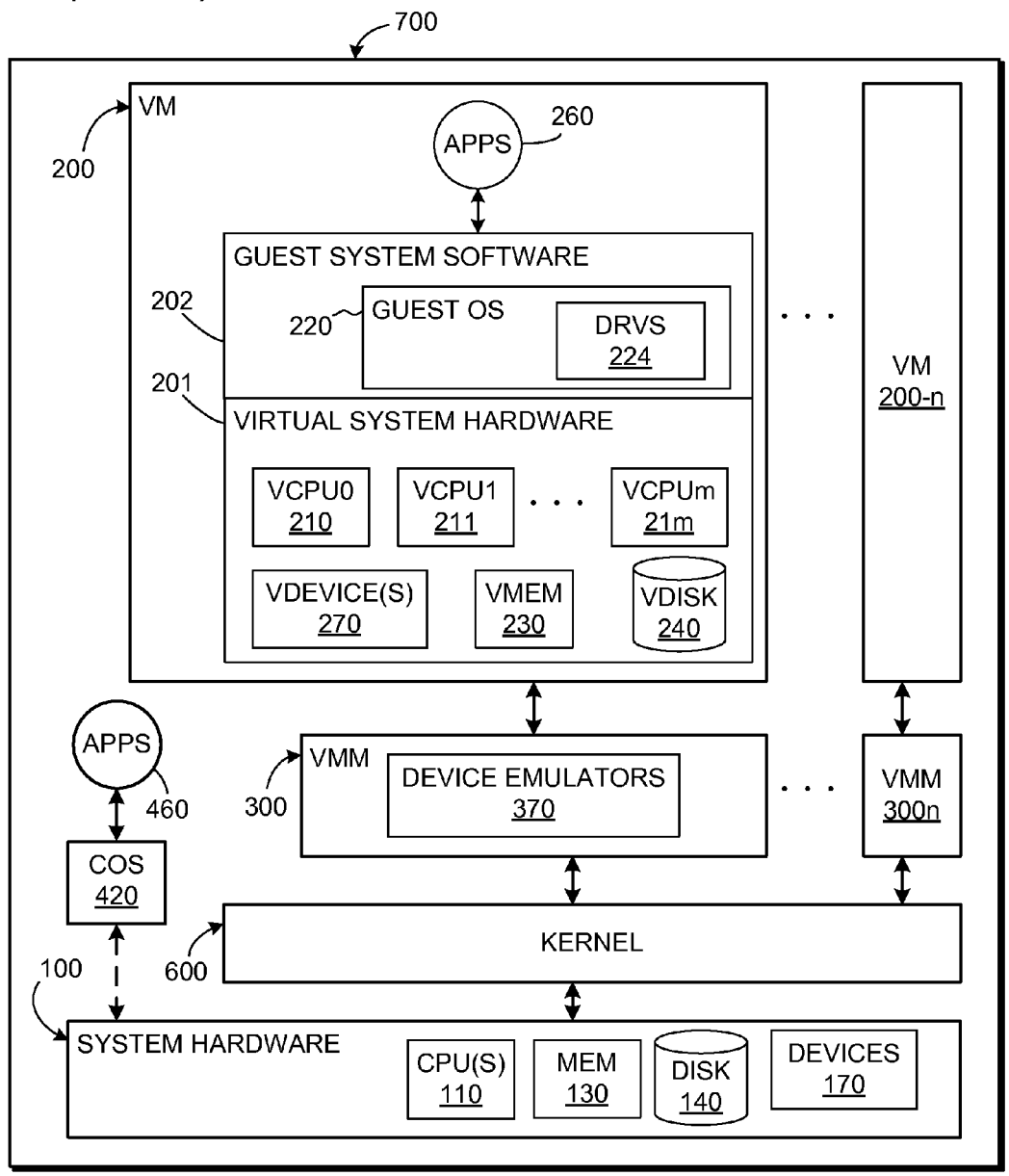
FIG. 1A is a block diagram of a computer system that implements Non-Hosted virtualization.
Figure 1B:
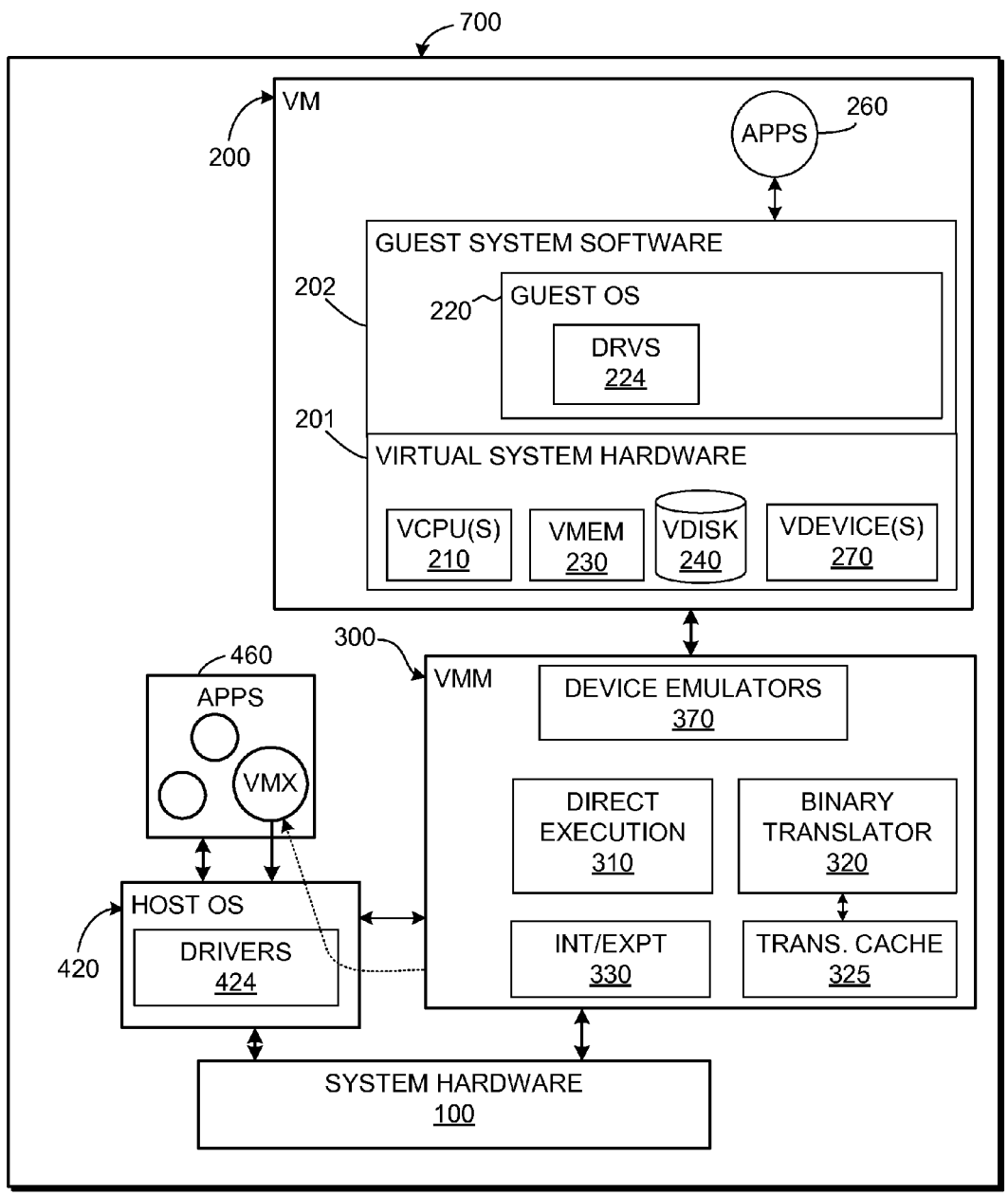
FIG. 1B is a block diagram of a computer system that implements Hosted virtualization.
Figure 2:
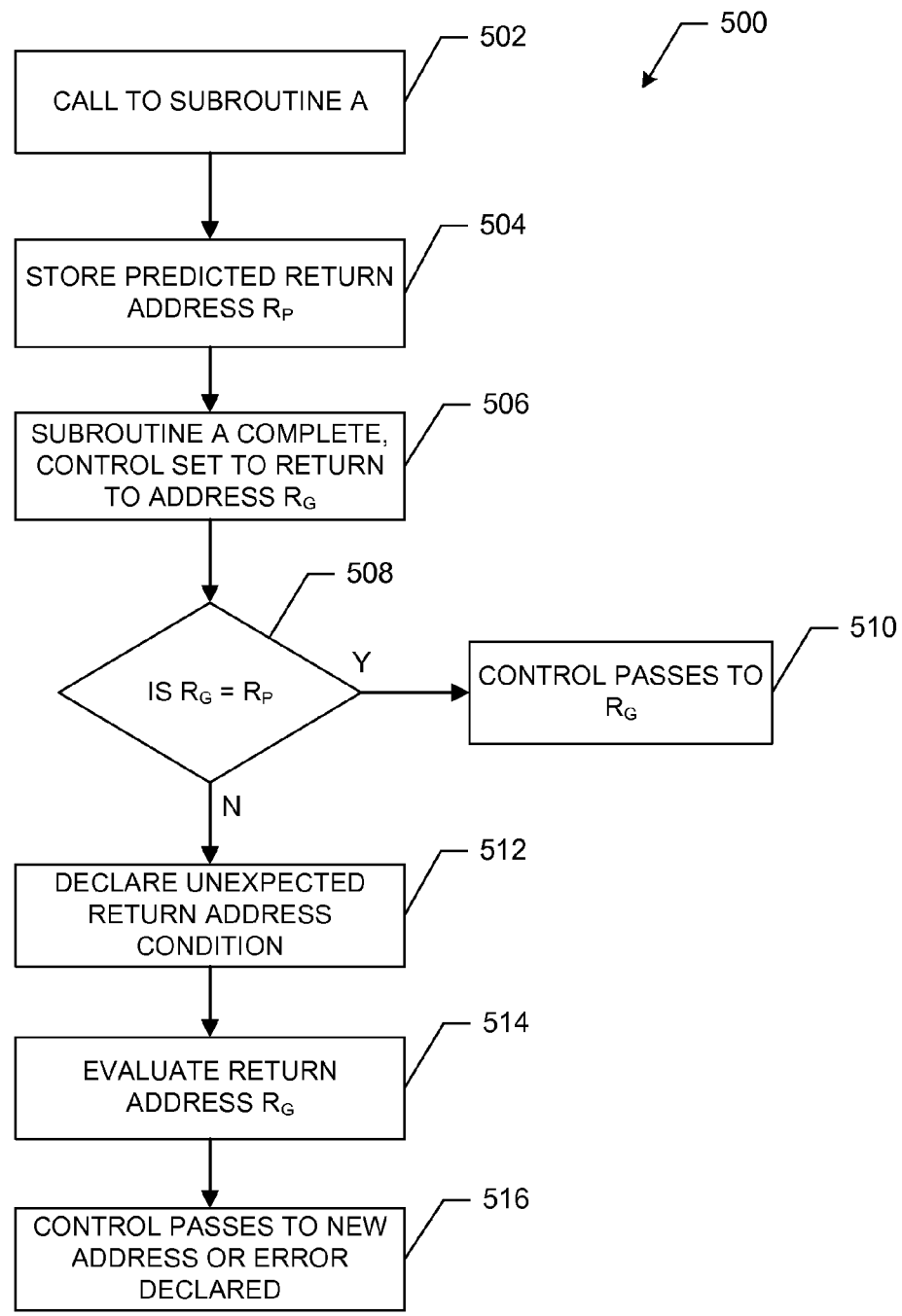
FIG. 2 is a flowchart of a method according to one embodiment of the present invention.

An embodiment of the present invention follows along method 500, shown generally in FIG. 2. In a first step 502, for example, while executing a sequence of computer instructions in a computer system, a call to subroutine A is implemented. Subsequently, step 504, and in accordance with known prediction mechanisms, a predicted return address $R_P$ is stored. Upon completion of subroutine A, including any and all nested subroutines, control is set to return to memory address $R_G$, step 506. As part of the operation of the prediction mechanism, in step 508, a comparison of the return address $R_G$ and the predicted return memory address $R_P$ is performed. If the two return addresses are equal, then control passes, step 510, to the instruction address $R_G$.

Alternatively, if the predicted return address $R_P$ is not the same as the return address $R_G$, i.e., a "mis-prediction," then in step 512 an unexpected return address condition is declared. At step 514, in accordance with one or more embodiments of the present invention, the generated return address $R_G$ is evaluated, as will be described below in more detail. Depending upon the analysis performed at step 514, at step 516, program control either passes to the predicted return address $R_P$; the generated return address $R_G$; or a new return address; or an error condition is declared.

One embodiment of the present invention may be implemented, and will be described below, in the context of an x86 Central Processing Unit as is available from Intel Corporation, Santa Clara, Calif. It should be noted that this CPU example is one embodiment of the present invention and is not meant to limit any of the claims appended hereto.

Figure 3:
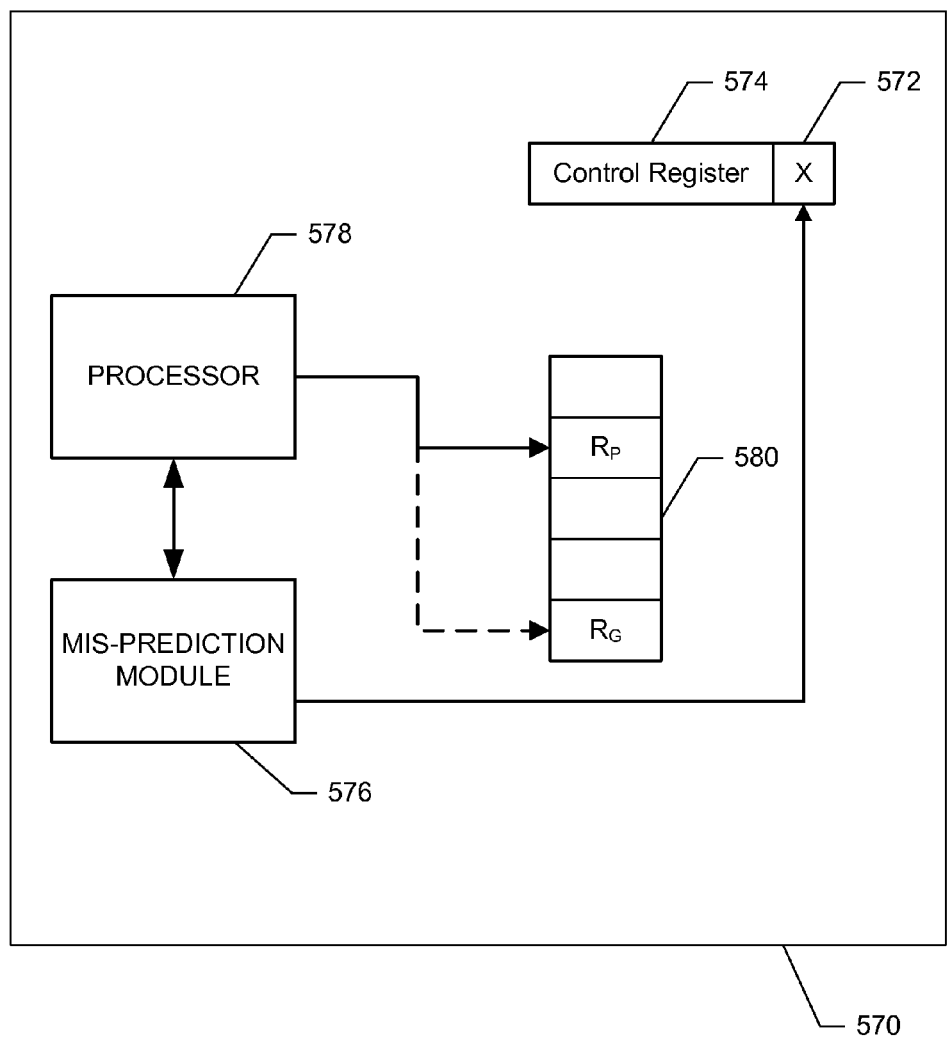
FIG. 3 is a block diagram of an embodiment of the present invention.

Referring to FIG. 3, CPU 570, generally, would use an instruction set that is unchanged from that which is known. There may be an extra bit of state 572 stored, for example, in a control register 574 that indicates whether an operation relating to one or more embodiments of the invention, i.e., "piggybacking" of the bug detection, is active. Alternatively, rather than a bit in a control register, the determination as to whether or not the bug detection is enabled may be derived from other state conditions found in CPU 570. A mis-prediction module 576 coupled to processor 578, will provide a "mis-prediction fault" alongside any existing types of faults, for example, page fault, division by zero, etc. Instruction register 580 includes the return addresses, i.e., the memory location storing the return addresses, used by processor 578 in implementing any code running thereon. If an indirect control flow instruction is mis-predicted by mis-prediction module 576 and the bug detection operation is enabled as per control bit 572, for example, then CPU 570 will generate a mis-prediction fault. This embodiment of the present invention would incur no performance penalty when the bug detection operation is "off."

As above, the detection of an arc-injection attack is one embodiment of the present invention. Advantageously, analysis of mis-predicted or indirect control flow instructions increases the information that the hardware, or the virtual hardware in a virtual environment, has about what should occur when certain instructions execute. By operation of the bug detection with the mis-predicted control flow, more information can be communicated between software and hardware operations.

Figures 4, 5:
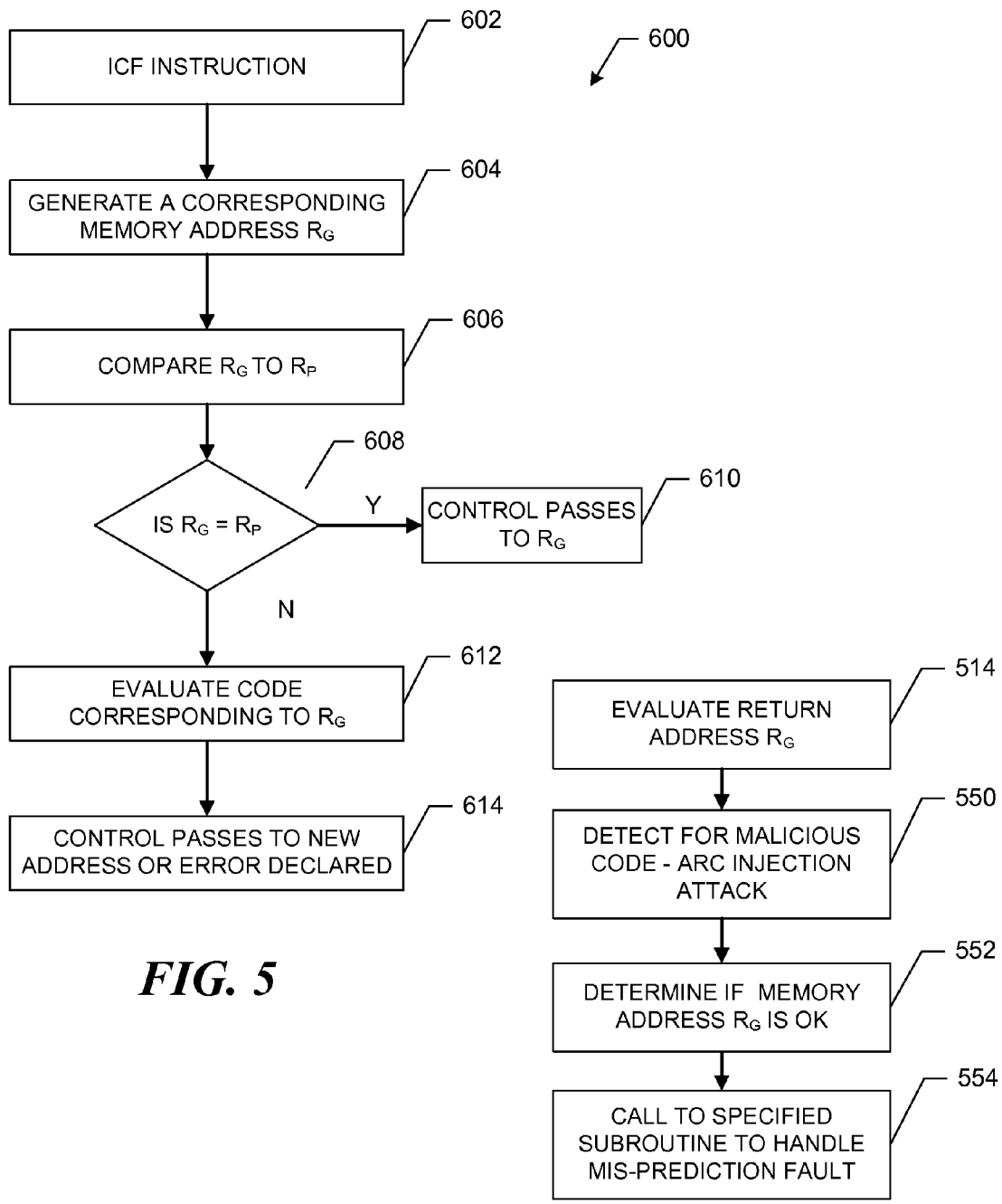
FIG. 4 is a flowchart of a method according to an embodiment of the present invention.
FIG. 5 is a flowchart of a method according to another embodiment of the present invention.

Returning to method 500 shown in FIG. 2, the step of evaluating a return address $R_G$, i.e., step 514, comprises other sub-steps as shown in FIG. 4. At step 550, the detection of malicious code, for example, an arc injection attack, can be performed by analyzing the return address $R_G$, the state of one or more registers in the CPU, either actual or virtual, as well as values found therein, and program code to which return address $R_G$ is pointing.

The value of the memory address $R_G$ could be analyzed to determine how the value was placed there. For example, if the bytes that are on the stack, i.e., where memory address $R_G$ is stored, are the same as bytes that recently came across a network connection, a determination of a malicious attack being underway or being attempted may be made. Alternately, in the case of a return instruction, it may be suspicious if the program return is being directed to a location other than right after a CALL instruction. Further, a return destination that is not at the beginning of a function may be cause for further analysis of the code.

A mis-prediction determination may have shades of grey, rather than being a yes or no decision. In one embodiment of the present invention, the analysis may determine that while the return address $R_G$ was not that which was predicted, continuing operation from this location is not harmful, and in some case, may be beneficial and therefore be allowed to continue. In yet another embodiment, a particular return address and/or combination of values may trigger an unexpected return address condition that would then be evaluated by an embodiment of the present invention. In this case, software may specify to the hardware what it would consider a "mis-prediction."

Ultimately, in step 552, a determination is made as to whether or not address $R_G$ is acceptable. In yet another embodiment, at step 554, a call to a specified subroutine to handle the mis-prediction fault may be implemented.

Embodiments of the present invention are not limited to analyzing return addresses in code related to a subroutine. An indirect control flow instruction, irrespective of its application, can benefit from one or more embodiments of the present invention.

Method 600, in accordance with one embodiment of the present invention, is applied to an indirect control-flow (ICF) instruction as will be described with respect to FIG. 5. Initially, at step 602, the ICF instruction is obtained. A corresponding memory address $R_G$ value is obtained at step 604. At step 606, the memory address $R_G$ value is compared to a predicted memory address $R_P$ value. If the two memory address values are the same, step 608, control passes to begin execution at memory address $R_G$, step 610. If, however, the two values are not equal, control passes to step 612 where the code corresponding to memory address $R_G$ is evaluated similar to that which has been described above with respect to the methods discussed in FIGS. 2 and 4.

In general, as described above, "piggybacking" onto a mis-prediction fault, in accordance with embodiments of the present invention, allows for providing more information as to the condition of the program and/or related hardware and provides a programmer with multiple options as to how to proceed. With regard to a virtual environment, if the functionality of a compiler is not available, for example, when only a binary program is available, then binary analysis and binary translation implementations of the present invention can be used. Further, rather than "faulting," the detection of a mis-prediction may instead cause an "exit" in an implementation with respect to the VT/SVM Hypervisor implementation available from VMware, Inc. of Palo Alto, Calif. That is, an exit in a VT/SVM sense may be a branch to a handler whose location is specified by the control/flow instruction, or which has previously been communicated to the hardware, invocation of a hardware/microcode handler, etc.

As above, in some implementations, when "mis-prediction" has shades of grey rather than being a yes or no decision, embodiments of the present invention may still piggyback on some paths taken by the hardware or software instruction-execution mechanism.

In some implementations, programmers, via the compilers and other software that they write, can prepare the code that is invoked upon a mis-prediction. Typically, this code will look for "exceptional" circumstances, such as a "return" instruction that transfers control to an instruction not proceeded by a call, or, for example, a C++ Vtable entry that does not point to a start of a function, virtual or otherwise. The implementation of "switch statements" and "computed GOTOs" and other high-level, control-flow operations may also benefit from moving uncommon code to a "mis-prediction handler."

An alternate embodiment of the present invention can modify, i.e., learn, which mis-predicted values are acceptable and which ones are not. Thus, via an updating mechanism, performance may be improved over time as the system "learns" to better differentiate acceptable and unacceptable mis-predictions.

Embodiments of the present invention may be used to advantage in both a hosted and a non-hosted virtualized computer system, regardless of the degree of virtualization in which the virtual machine(s) have any number of physical and/or logical virtualized processors Embodiments of the invention have herein been described, by way of example only, with reference to the accompanying drawings. It is stressed that the particulars shown are by way of example and for purposes of illustrative discussion of the various embodiments of the present invention only, and are presented in the cause of providing, what is believed to be, the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

It is to be understood that the invention is not limited in its application to the details of construction and the arrangement of the components set forth in the description or illustrated in the drawings. The invention is capable of other embodiments or of being practiced or carried out in various ways. Also, it is to be understood that the phraseology and terminology employed herein are for the purpose of description and should not be regarded as limiting.

It is appreciated that certain features of the invention, which are, for the sake of clarity, described in the context of separate embodiments, may also be provided in combination in a single embodiment. Conversely, various features of the invention, which are, for brevity, described in the context of a single embodiment, may also be provided separately or in any suitable subcombination.

This invention may be implemented in a variety of virtual computer systems, based on a variety of different physical computer systems. An embodiment of the invention is described in connection with a specific virtual computer system simply as an example of implementing the invention. The scope of the invention should not be limited to, or by, the exemplary implementation. Further, an embodiment of this invention may be implemented in hardware, that is, a non-virtualized system, for example, a CPU.

Embodiments of the present invention provide an advantage in any system executing machine instructions where indirect control-flow (including "return" instructions) may be "attacked" by malicious changes to the data that control such instructions. One such system is a CPU device. A "virtualized" CPU, as found in virtualization systems from VMware Inc., Palo Alto, Calif., can also advantageously leverage the benefits of the present invention.

Embodiments of the above-described invention may be implemented in all software, all hardware, or a combination of hardware and software, including program code stored in a firmware format to support dedicated hardware. A software implementation of the above described embodiment(s) may comprise a series of computer instructions either fixed on a tangible medium, such as a computer readable media, e.g. diskette, CD-ROM, ROM, or fixed disk or transmittable to a computer system in a carrier wave, via a modem or other interface device. The medium can be either a tangible medium, including but not limited to optical or analog communications lines, or may be implemented with wireless techniques, including but not limited to microwave, infrared or other transmission techniques.

The series of computer instructions whether contained in a tangible medium or a carrier wave embodies all or part of the functionality previously described herein with respect to the invention. Those skilled in the art will appreciate that such computer instructions can be written in a number of programming languages for use with many computer architectures or operating systems and may exist in machine executable format.

Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the present invention have been disclosed, it will be apparent to those skilled in the art that changes and modifications can be made which will achieve some of the advantages of the invention without departing from the general concepts of the invention. It will be apparent to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results.

The invention may also be implemented directly in a computer's primary OS, both where the OS is designed to support virtual machines and where it is not.

Moreover, the invention may be implemented wholly or partially in hardware, for example in processor architectures intended to provide hardware support for virtual machines.

Unless otherwise indicated, the invention described above may be used in virtualized computer systems having any type or configuration of virtualization software.

What is claimed is:

1. A method of analyzing a first sequence of instructions, in a computer system comprising a virtual machine running a guest operating system, the method comprising, for each instruction of an indirect control flow (ICF) type in the first sequence:

generating a memory address $R_G$;

comparing the generated memory address $R_G$ to a corresponding predicted memory address $R_P$; and
if it is determined that the generated memory address $R_G$ is not the same as the predicted memory address $R_P$, then causing a hardware virtualization exit to a handler and evaluating at least one of:
directed program code corresponding to the generated memory address $R_G$ prior to execution thereof; and
the generated memory address $R_G$, the evaluating of the generated memory address $R_G$ comprising comparing data bytes at the generated memory address $R_G$ with data bytes known to be recently received over a network connection, the method further comprising determining that malicious software code has been detected when the data bytes at the generated memory address $R_G$ are determined to be the same as the data bytes known to be recently received over the network connection.

2. The method of claim 1, wherein evaluating the directed program code comprises evaluating software code corresponding to the generated memory address $R_G$ for the presence of malicious code.

3. The method of claim 2, further comprising evaluating the first sequence of instructions for the presence of an arc injection attack.

4. The method of claim 1, wherein evaluating the directed program code comprises evaluating at least one directed software instruction corresponding to a memory address at, or subsequent to, the generated memory address $R_G$ to determine whether or not malicious software code is present therein.

5. The method of claim 4, further comprising at least one of:
evaluating a state of a register; and
evaluating a value stored in a location in the register.

6. The method of claim 4, wherein if the evaluated at least one software instruction comprises malicious software code, the method further comprising:
setting an indication that an error condition has occurred; and
halting execution of the first sequence of instructions.

7. The method of claim 4, wherein if the evaluated at least one directed software instruction comprises malicious software code, the method further comprising continuing execution of the first sequence of instructions at an alternate memory address different from the generated memory address $R_G$.

8. The method of claim 4, further comprising continuing execution of the directed program code at the generated memory address $R_G$ if the evaluated at least one software instruction is determined to not be malicious software code.

9. The method of claim 8, further comprising if the evaluated at least one software instruction is determined to not be malicious software code then storing one or more characteristics of the program code corresponding to the generated memory address $R_G$ as one or more indicators of non-malicious software code.

10. The method of claim 1, wherein the hardware virtualization is Intel Virtualization Technology (VT) or AMD Secure Virtual Machine (SVM).

11. The method of claim 3, wherein evaluating the first sequence of instructions further comprises at least one of:
evaluating a value read by the first sequence of instructions; and
evaluating a value written by the first sequence of instructions.

12. A method of executing a first sequence of instructions, in a computer system comprising a virtual machine running a guest operating system, the method comprising, for each instruction:
determining if the instruction is of an indirect control flow (ICF) type;
if it is determined that the instruction is of the ICF type:
generating a memory address $R_G$;
comparing the generated memory address $R_G$ to a corresponding predicted memory address $R_P$; and
if it is determined that the generated memory address $R_G$ is not the same as the predicted memory address $R_P$, then causing a hardware virtualization exit to a handler and evaluating at least one of:
directed program code corresponding to the generated memory address $R_G$ prior to execution thereof; and
the generated memory address $R_G$, wherein the evaluating of the generated memory address $R_G$ comprises comparing the generated memory address $R_G$ with data known to be recently received over a network connection, the method further comprising determining that malicious software code has been detected when the generated memory address $R_G$ is determined to be the same as the data known to be recently received over the network connection.

13. The method of claim 12, wherein evaluating the directed program code comprises evaluating at least one directed software instruction corresponding to a memory address at, or subsequent to, the generated memory address $R_G$ to determine whether or not malicious software code is present therein.

14. The method of claim 13, further comprising at least one of:
evaluating a state of a register; and
evaluating a value stored in a location in the register.

15. The method of claim 13, wherein if the evaluated at least one directed software instruction comprises malicious software code, the method further comprising:
setting an indication that an error condition has occurred; and
halting execution of the first sequence of instructions.

16. The method of claim 13, wherein if the evaluated at least one directed software instruction comprises malicious software code, the method further comprising continuing execution of the first sequence of instructions at an alternate memory address different from the generated memory address $R_G$.

17. The method of claim 13, further comprising continuing execution of the directed program code at the generated memory address $R_G$ if the evaluated at least one software instruction is determined to not be malicious software code.

18. The method of claim 17, further comprising if the evaluated at least one directed software instruction is determined to not be malicious software code then storing one or more characteristics of the program code corresponding to the generated memory address $R_G$ as one or more indicators of non-malicious software code.

19. The method of claim 12, wherein evaluating the directed program code comprises evaluating software code corresponding to the generated memory address $R_G$ for the presence of malicious code.

20. The method of claim 19, further comprising evaluating the first sequence of instructions for the presence of an arc injection attack.

21. The method of claim 12, wherein the hardware virtualization is Intel Virtualization Technology (VT) or AMD Secure Virtual Machine (SVM).

22. The method of claim 20, wherein evaluating the first sequence of instructions further comprises at least one of:
   evaluating a value read by the first sequence of instructions; and
   evaluating a value written by the first sequence of instructions.

23. A method of analyzing program code in a computer system comprising a virtual machine running a guest operating system, the method comprising:
   executing a sequence of instructions in the computer system;
   for a subroutine call executed in the sequence of instructions:
      determining a corresponding predicted memory address $R_P$; and
      storing the predicted memory address $R_P$;
   upon completion of execution of the called subroutine:
      retrieving the predicted memory address $R_P$; and
      comparing a return address $R_G$ to the predicted memory address $R_P$; and
   if the return address $R_G$ is not the same as the predicted memory address $R_P$, then causing a hardware virtualization exit to a handler and evaluating at least one of:
      directed program code corresponding to the return address $R_G$ prior to execution thereof; and
      the return address $R_G$, the evaluating of the return address $R_G$ comprising comparing the return address $R_G$ with data known to be recently received over a network connection, the method further comprising determining that malicious software code has been detected when the return address $R_G$ is determined to be the same as the data known to be recently received over the network connection.

24. The method of claim 23, wherein evaluating the directed program code comprises evaluating at least one software instruction corresponding to a memory address at, or subsequent to, the return address $R_G$ to determine whether or not malicious software code is present.

25. The method of claim 24, further comprising at least one of:
   evaluating a state of a register; and
   evaluating a value stored in a location in the register.

26. The method of claim 24, wherein if the evaluated at least one software instruction comprises malicious software code, the method further comprising:
   setting an indication that an error condition has occurred; and
   halting execution of the program code.

27. The method of claim 24, wherein if the evaluated at least one software instruction comprises malicious software code, the method further comprising continuing execution of the program code at an alternate memory address different from the return address $R_G$.

28. The method of claim 24, further comprising continuing execution of the program code at the return address $R_G$ if the evaluated at least one software instruction is determined to not be malicious software code.

29. The method of claim 28, further comprising if the evaluated at least one software instruction is determined to not be malicious software code then storing one or more characteristics of the program code corresponding to the return address $R_G$ as one or more indicators of non-malicious software code.

30. The method of claim 23, wherein evaluating the directed program code comprises evaluating software code corresponding to the return address $R_G$ for the presence of malicious code.

31. The method of claim 30, further comprising evaluating software code for the presence of an arc injection attack.

32. The method of claim 23, wherein the hardware virtualization is Intel Virtualization Technology (VT) or AMD Secure Virtual Machine (SVM).

33. The method of claim 31, wherein evaluating the first sequence of instructions further comprises at least one of:
   evaluating a value read by the first sequence of instructions; and
   evaluating a value written by the first sequence of instructions.

34. A method of analyzing program code in a computer system, the method comprising:
   executing a sequence of computer instructions;
   executing a subroutine in the sequence of instructions;
   generating a return address $R_G$;
   upon completion of the execution of the subroutine, comparing the return address $R_G$ to a predicted memory address $R_P$; and
   if it is determined that return address $R_G$ is not the same as the predicted memory address $R_P$, then evaluating the return address $R_G$, wherein evaluating the generated memory address $R_G$ includes comparing data bytes at the generated memory address $R_G$ with data bytes known to be recently received over a network connection and if the data bytes at the generated memory address $R_G$ are determined to be the same as the data bytes known to be recently received over the network connection, determining that malicious software code has been detected.

35. The method of claim 34, further comprising:
   storing the predicted memory address $R_P$ in a register; and
   storing the return address $R_G$ in a register.

36. The method of claim 34, wherein generating a memory address $R_G$ occurs if a bit controlling bug detection is set in a control register.

37. A system for analyzing program code, the system comprising:
   a processor for executing a sequence of instructions, the sequence of instructions comprising a first subroutine; and
   a mis-prediction module coupled to the processor to receive therefrom, if a bit controlling bug detection is set in a control register, a generated memory address $R_G$ representing a memory address at which the processor will resume execution upon completion of execution of the first subroutine, wherein the mis-prediction module compares the generated memory address $R_G$ to a predicted memory address $R_P$ and, if the generated memory address $R_G$ is not the same as the predicted memory address $R_P$, analyzes at least one of:
   program code corresponding to the generated memory address $R_G$; and
   the generated memory address $R_G$, wherein the analysis of the generated memory address $R_G$ comprises comparing the generated memory address $R_G$ with data known to be recently received over a network connection, malicious software code being determined if the generated memory address $R_G$ is determined to be the same as the data known to be recently received over the network connection.

38. The system of claim 37, wherein the mis-prediction module evaluates the sequence of instructions, starting at the generated memory address $R_G$, for the presence of malicious software code.

39. The system of claim 38, wherein the mis-prediction module evaluates the sequence of instructions for the presence of an arc injection attack.

40. The system of claim 38, wherein the mis-prediction module instructs the processor to continue execution of the sequence of computer instructions at the generated memory address $R_G$ when no malicious code is found.

41. The system of claim 38, wherein:
if it is determined that the sequence of instructions starting at the generated memory address $R_G$ comprises malicious code, then the mis-prediction module determines if a sequence of instructions starting at the predicted memory address $R_P$ comprises valid and non-malicious code; and
if the sequence of instructions starting at the predicted memory address $R_P$ comprises valid and non-malicious code, the mis-prediction module instructs the processor to continue execution of the sequence of instructions at the predicted memory address R.

42. The system of claim 41, wherein:
the mis-prediction module sets an error condition and halts execution of the program by the processor if the sequence of instructions starting at the predicted memory address $R_P$ is determined to be one of:
invalid or contains malicious code.

43. The system of claim 41, wherein the mis-prediction module instructs the processor to continue execution at a predetermined memory address different from the predicted memory address $R_P$ and the generated memory address $R_G$ if the mis-prediction module determines that the sequence of instructions starting at the predicted memory address $R_P$ is invalid or contains malicious code.

44. A system for analyzing program code, the system comprising:
a processor for executing a sequence of instructions, the sequence of instructions comprising an indirect control flow (ICF) instruction; and
a mis-prediction module coupled to the processor to receive therefrom, if a bit controlling bug detection is set in a control register, a generated memory address $R_G$, corresponding to the ICF instruction, representing a memory address at which the processor will continue execution, the generated memory address $R_G$ being a function of data in the corresponding ICF instruction, wherein the mis-prediction module compares the generated memory address $R_G$ to a predicted memory address $R_P$ and, if the generated memory address $R_G$ is not the same as the predicted memory address $R_P$ analyzes program code corresponding to the generated memory address $R_G$, wherein the analysis of the generated memory address $R_G$ comprises comparing the generated memory address $R_G$ with data known to be recently received over a network connection, malicious software code being determined if the generated memory address $R_G$ is determined to be the same as the data known to be recently received over the network connection.

45. The system of claim 44, wherein the mis-prediction module evaluates the sequence of instructions, starting at the generated memory address $R_G$, for the presence of malicious software code.

46. The system of claim 45, wherein the mis-prediction module evaluates the sequence of instructions for the presence of an arc injection attack.

47. The system of claim 46, wherein the mis-prediction module instructs the processor to continue execution of the sequence of computer instructions at the generated memory address $R_G$ when no malicious code is found.

48. The system of claim 45, wherein:
if it is determined that the sequence of instructions starting at the generated memory address $R_G$ comprises malicious code, then the mis-prediction module determines if a sequence of instructions starting at the predicted memory address $R_P$ comprises valid and non-malicious code; and
if the sequence of instructions starting at the predicted memory address $R_P$ comprises valid and non-malicious code, the mis-prediction module instructs the processor to continue execution of the sequence of instructions at the predicted memory address $R_P$.

49. The system of claim 48, wherein:
the mis-prediction module sets an error condition and halts execution of the sequence of instructions by the processor if the sequence of instructions starting at the predicted memory address $R_P$ is determined to be one of:
invalid or contains malicious code.

50. The system of claim 49, wherein the mis-prediction module instructs the processor to continue execution at a predetermined memory address different from the predicted memory address $R_P$ and the generated memory address $R_G$ if the mis-prediction module determines that the sequence of instructions starting at the predicted memory address $R_P$ is invalid or contains malicious code.

51. A computer program product for analyzing, in a computer system, each instruction of an indirect control flow (ICF) type in a first sequence of instructions, the computer program product comprising a computer usable medium that is non-transitory having computer readable (CR) program code thereon, including:
CR program code for generating a memory address $R_G$, if a bit controlling bug detection is set in a control register;
CR program code for comparing the generated memory address $R_G$ to a corresponding predicted memory address $R_P$; and
CR program code for evaluating at least one of directed program code corresponding to the generated memory address $R_G$, prior to execution thereof, and the generated memory address $R_G$ if it is determined that the generated memory address $R_G$ is not the same as the predicted memory address $R_P$, the evaluating of the return address $R_G$ comprising comparing the return address $R_G$ with data known to be recently received over a network connection, the CR program code determining that malicious software code has been detected when the return address $R_G$ is determined to be the same as the data known to be recently received over the network connection.

52. The computer program product of claim 51, further comprising: CR program code for evaluating at least one directed software instruction corresponding to a memory address at, or subsequent to, the generated memory address $R_G$ to determine whether or not malicious software code is present therein.

53. The computer program product of claim 52, further comprising at least one of:
CR program code for evaluating a state of a register; and
CR program code for evaluating a value stored in a location in the register.

54. The computer program product of claim 52, further comprising CR program code for, if the evaluated at least one software instruction is determined to not be malicious software code, storing one or more characteristics of the program code corresponding to the generated memory address $R_G$ as one or more indicators of non-malicious software code.

55. The computer program product of claim 52, further comprising CR program code for setting an indication that an error condition has occurred and halting execution of the first sequence of instructions if the evaluated at least one software instruction comprises malicious software code.

56. The computer program product of claim 52, further comprising CR program code for continuing execution of the first sequence of instructions at an alternate memory address different from the generated memory address $R_G$ if the evaluated at least one directed software instruction comprises malicious software code.

57. The computer program product of claim 51, further comprising CR program code for evaluating software code corresponding to the generated memory address $R_G$ for the presence of malicious code.

58. The computer program product of claim 57, further comprising CR program code for evaluating the first sequence of instructions for the presence of an arc injection attack.

59. The computer program product of claim 58, wherein the CR program code for evaluating the first sequence of instructions further comprises CR program code for evaluating at least one of a value read by the first sequence of instructions and a value written by the first sequence of instructions.

60. The system of claim 39, wherein the mis-prediction module evaluates at least one of a value read by the first sequence of instructions and a value written by the first sequence of instructions.

* * * * *